United States Patent [19]

Hundal et al.

[11] Patent Number: 4,780,270

[45] Date of Patent: Oct. 25, 1988

[54] PASSIVE SHUT-DOWN HEAT REMOVAL SYSTEM

[75] Inventors: Rolv Hundal, Greensburg; John E. Sharbaugh, Bullskin Township, Fayette County, both of Pa.

[73] Assignee: The United States of America as represented by the United States Department of Energy, Washington, D.C.

[21] Appl. No.: 896,030

[22] Filed: Aug. 13, 1986

[51] Int. Cl.⁴ ............................................. G21C 15/18
[52] U.S. Cl. .................................. 376/299; 376/404; 376/461
[58] Field of Search ............... 376/290, 298, 299, 404, 376/405, 461

[56] References Cited

U.S. PATENT DOCUMENTS 4,115,192 9/1978 Jogand .
4,478,784 10/1984 Burelbach .

FOREIGN PATENT DOCUMENTS 2346868 3/1975 Fed. Rep. of Germany ...... 376/298
1421826 1/1976 United Kingdom ................ 376/298

OTHER PUBLICATIONS

Report entitled, "State-of-the-Art Report on Shut-down Heat Removal Systems", dated Jun. 1985, prepared by the Westinghouse Electric Corp. for the Department of Energy.
Report entitled, "Inherent Safety Technology Quarterly Progress Report for Period Ending Oct. 31, 1985", prepared by the Westinghouse Electric Corp. for the U.S. Dept. of Energy and published Dec. 1985.

Primary Examiner—Charles T. Jordan
Assistant Examiner—Richard W. Wendtland

[57] ABSTRACT

An improved shut-down heat removal system for a liquid metal nuclear reactor of the type having a vessel for holding hot and cold pools of liquid sodium is disclosed herein. Generally, the improved system comprises a redan or barrier within the reactor vessel which allows an auxiliary heat exchanger to become immersed in liquid sodium from the hot pool whenever the reactor pump fails to generate a metal-circulating pressure differential between the hot and cold pools of sodium. This redan also defines an alternative circulation path between the hot and cold pools of sodium in order to equilibrate the distribution of the decay heat from the reactor core. The invention may take the form of a redan or barrier that circumscribes the inner wall of the reactor vessel, thereby defining an annular space therebetween. In this embodiment, the bottom of the annular space communicates with the cold pool of sodium, and the auxiliary heat exchanger is placed in this annular space just above the drawn-down level that the liquid sodium assumes during normal operating conditions. Alternatively, the redan of the invention may include a pair of vertically oriented, concentrically disposed standpipes having a piston member disposed between them that operates somewhat like a pressure-sensitive valve. In both embodiments, the cessation of the pressure differential that is normally created by the reactor pump causes the auxiliary heat exchanger to be immersed in liquid sodium from the hot pool. Additionally, the redan in both embodiments forms a circulation flow path between the hot and cold pools so that the decay heat from the nuclear core is uniformly distributed within the vessel.

25 Claims, 4 Drawing Sheets

PASSIVE SHUT-DOWN HEAT REMOVAL SYSTEM

BACKGROUND OF THE INVENTION

1. Field of the Invention

This invention relates to a passive shut-down heat removal system for use in either a pool-type or loop-type liquid metal cooled nuclear reactor.

2. Description of the Prior Art

Systems for removing the decay heat within pool-type liquid metal reactors in the event of a shut-down condition are known in the prior art. Generally, such heat removal systems include an auxiliary heat exchanger formed from a loop of stainless steel piping that is formed into coils at either end, and includes a heat exchange medium, such as a mixture of liquid sodium and liquid potassium. The coils at one end of this loop of pipe are immersed in the hot pool of liquid sodium within the reactor vessel, while the coils at the other end are positioned outside of the reactor vessel and disposed within a flue. The entrance of the flue is covered by a set of louvers that may be selectively opened by electric motors. Such auxiliary heat exchangers form the heart of what is known as a direct reactor auxiliary cooling system (or DRACS) in the nuclear engineering art. When a shut-down condition occurs in which the normal reactor heat rejection system becomes unavailable, the louvers over the flue entrance are opened by actuating the electric motors, which in turn allows a naturally created draft of ambient air to flow through the flue and over the coils of the loop of pipe that forms the auxiliary heat exchanger, thereby cooling the hot pool of sodium. Such a shut-down condition might occur, for example, as a result of the failure of the secondary system pumps to circulate liquid sodium from the intermediate heat exchangers in the hot sodium pool to the steam generators of the plant.

While such prior art shut-down heat removal systems are capable under most circumstances of removing the decay heat from the pools of liquid sodium in the event of such a pump failure or other emergency shut-down condition, problems could arise in circumstances where the nuclear plant facility experienced a total blackout of electrical power that rendered the louver motors inoperative, or in a case where the louvers malfunctioned and became stuck in the closed position. Additionally, the structure of these auxiliary coils creates other problems in the over-all design of the reactor facility. However, before these problems may be fully appreciated, some understanding of the structure and operation of pool-type nuclear reactors is necessary.

Pool-type liquid metal reactors are generally formed from a reactor vessel formed from stainless steel that is in turn circumscribed by a guard vessel. The bottom of the reactor vessel is filled with a pool of liquid sodium that has a temperature of approximately 670° F., while the middle and upper portions of this vessel are filled with a pool of liquid sodium that is heated to a temperature of approximately 950° F. Hence the top and bottom pools within the reactor vessel are known as the hot and cold pools, respectively. A support plate spaced from the bottom wall of the reactor vessel defines a pressure boundary between the hot and cold pools of liquid sodium. Below the hot pool, a nuclear core is centrally supported on the upper surface of the support plate and completely immersed in liquid sodium. Also included in the hot pool are a multiplicity of primary pump standpipes as well as intermediate heat exchangers. The bottom end of each primary pump standpipe is attached to the support plate and includes both an inlet and an outlet conduit. The inlet draws sodium from the cold pool out of the cold pool plenum formed between the support plate and the bottom of the reactor vessel. The outlet conduit directs a relatively cold flow of liquid sodium into the entrance of the nuclear core in order that it may be circulated through a bank of nuclear fuel rod assemblies before being injected into the hot pool above. The intermediate heat exchangers in the hot pool circulate a flow of hot sodium to a secondary heat exchange system, which is ultimately used to generate nonradioactive steam to turn the blades of a turbine attached to an electric generator. The bottom end of the intermediate heat exchanger includes an output port that communicates with the pool of cold liquid sodium, and liquid sodium whose heat energy has been transferred into the intermediate heat exchange system flows through this outlet port to replace the liquid sodium that is constantly being sucked into the primary pump.

Under normal operating circumstances, the primary pump and the intermediate heat exchangers maintain the liquid sodium in the hot pool at a temperature of approximately 950° F. At such a temperature, the free surface of the liquid sodium that forms the hot pool is maintained at a predetermined design level that is well below the upper edge of the reactor vessel. However, if the normal heat rejection system should fail, most of the decay heat generated by the nuclear core would be absorbed within the hot pool of sodium. If no shutdown heat removal system is included within the design of the pool-type reactor, the decay heat could raise the temperature of the liquid sodium in the hot pool well above its design temperature, which would cause it to thermally expand to a level that floods the bottom of the reactor vessel closure. The excessive high temperature would also damage the core fuel elements and other structures of the reactor. While the resulting sodium expansion would be contained by the reactor vessel, the resulting shut-down and repair of the reactor and clean-up of the sodium would be very expensive and hence highly undesirable.

The purpose of providing a shut-down heat removal system in a pool-type liquid metal reactor is to prevent the temperature of the liquid sodium in the hot pool from rising to a level where thermal damage is incurred by the reactor core and structural members. Unfortunately, prior art shut-down heat removal systems that are dependent upon electrically powered components, such as the previously mentioned louver motors, may fail to operate in the event of a total electrical power failure. In an attempt to minimize the risk of such failure, some of the systems which utilize movable louvers are designed so that they may be manually cranked open. However, such a shut-down heat removal system is still susceptible to failure in the event of a plant accident that simultaneously injures the plant operators while causing a power failure. Still another shortcoming of this system arises from the fact that the coils of the auxiliary heat exchanger are mounted on top of the intermediate heat exchanger that stands in the hot pool of the reactor. Such positioning of these coils necessitates a lengthening of the height of the reactor vessel of about eight feet, which in turn substantially increases the construction cost of the reactor facility. Moreover, such a design is limited to pool-type liquid reactors, since the intermediate heat exchangers of loop-type metal reactors are positioned outside of the reactor vessel. Finally, the fact that the immersed coils of the auxiliary heat exchanger are always transferring some heat from the hot pool to an area outside of the reactor vessel creates heat losses that undermine the efficiency of the reactor.

Clearly, there is a need for a shut-down heat removal system that is in no way dependent upon electric motors or human operators. Ideally, such a system should be compatible with both pool-type and loop-type liquid metal reactor designs, and easily incorporated therein without the lengthening or alteration of the reactor vessel or other major components of the plant. Finally, such a shut-down heat removal system should be fully automatic in operation, simple in construction, and high in reliability without the creation of heat losses that impair the over-all efficiency of the reactor.

SUMMARY OF THE INVENTION

Generally, the invention is an improved shut-down heat removal system for a liquid metal nuclear reactor that includes an auxiliary heat exchange means, and a passively operated means for bringing the heat exchange means into thermal contact with the liquid metal in the reactor whenever the reactor pump ceases to create a pressure differential between the hot and cold sodium pools contained therein. In the preferred embodiment, the invention comprises a redan or wall mounted within the reactor vessel between the auxiliary heat exchange means and the liquid metal in the hot pool substantially prevents thermal contact between the auxiliary heat exchange means and the hot pool as long as the reactor pump creates a pressure differential between the hot and cool pools, but which allows the auxiliary heat exchange means to become substantially immersed within the hot pool if the reactor pump should cease to create such a pressure differential. Preferably, the redan within the reactor vessel also defines an alternative circulation path between the hot and the cold pools whenever the reactor pump fails in order to dissipate the decay heat and provide cold sodium to the cold pool, thereby preventing the core from becoming overheated. In one embodiment of the invention, the redan circumscribes the inner surface of the reactor vessel to define an annular space therebetween. The lower portion of this annular space communicates with the cold plenum of the reactor that holds the cold pool, while the upper portion of this annular space contains the auxiliary heat exchange means.

During normal operation, the reactor pump draws down the level of the liquid sodium in the annular space between the redan and the reactor vessel to a level that is below the level of the liquid sodium in the hot pool, and the auxiliary heat exchange means is positioned in the annular gas space between the redan and the vessel just above the drawn-down level of the liquid sodium contained therein. Since the cover gas surrounding the auxiliary heat exchange means is a relatively inefficient heat conductor, the auxiliary heat exchange means transmits little heat outside of the reactor vessel during the normal operation of the reactor. However, if the reactor pump should fail, the level of the liquid sodium within the annulus will rise and immerse the auxiliary heat exchange means so that a substantial amount of heat is conducted out of the vessel, and into the draft flue. Moreover, the upper edge of the redan is positioned only a relatively short distance above the normal operating level of the sodium in the hot pool, so that any significant thermal expansion that the sodium within the hot pool experiences as a result of the decay heat of the reactor core will cause this sodium to overflow the redan, and to come into circulating contact with the liquid sodium in the cold pool plenum. In this first embodiment, a syphon may be included to selectively initiate such a circulating flow between the hot and cold pools before the core decay heat causes the sodium in the hot pool to expand into a redan-overflowing condition.

In the second embodiment of the invention, the redan comprises a first standpipe having an upper end that includes an opening for admitting a flow of liquid sodium from the hot pool, and whose bottom end is secured onto the support plate that forms the pressure boundary between the hot pool and the cold pool. This first standpipe preferably includes a second standpipe which may be concentrically disposed within the first. The bottom end of the second standpipe preferably communicates with the cold pool of liquid sodium. Finally, a piston means is disposed between the first and second standpipes. The annular space between the first and second standpipes communicates with the output of the reactor pump, so that pressurized sodium lifts the piston means into a flow-obstructing position when the reactor pump is operational. However, the piston means is weighted so that it falls into a flow-admitting position when the reactor pump ceases to provide pressurized sodium into this annular space. In this embodiment, the auxiliary heat exchange means is located within the first upper portion of standpipe near the flow opening so that liquid metal from the hot pool flows over the auxiliary heat exchange means, through the second standpipe, and into circulation with the sodium in the cold pool whenever the reactor pump fails to generate enough pressure to maintain the piston means in its flow-obstructing position.

Both embodiments of the invention provide a system for removing the decay heat in a liquid metal reactor through entirely passive mechanisms that are triggered and operated as a result of changed pressure conditions between the hot and the cold pools which naturally result from a partial or total failure of the primary reactor pump. Additionally, both designs are compatible with both pool-type and loop-type liquid metal reactors, are simple and reliable in construction, and result in little or no heat loss during the normal operation of the reactor. Finally. because the invention obviates the need for flow-impairing louvers in the draft flues that house the outside ends of the auxiliary heat exchangers, the flue stacks may be made shorter, thereby reducing plant construction costs.

BRIEF DESCRIPTION OF THE SEVERAL FIGURES

DETAILED DESCRIPTION OF THE PREFERRED EMBODIMENTS

Figure 1:
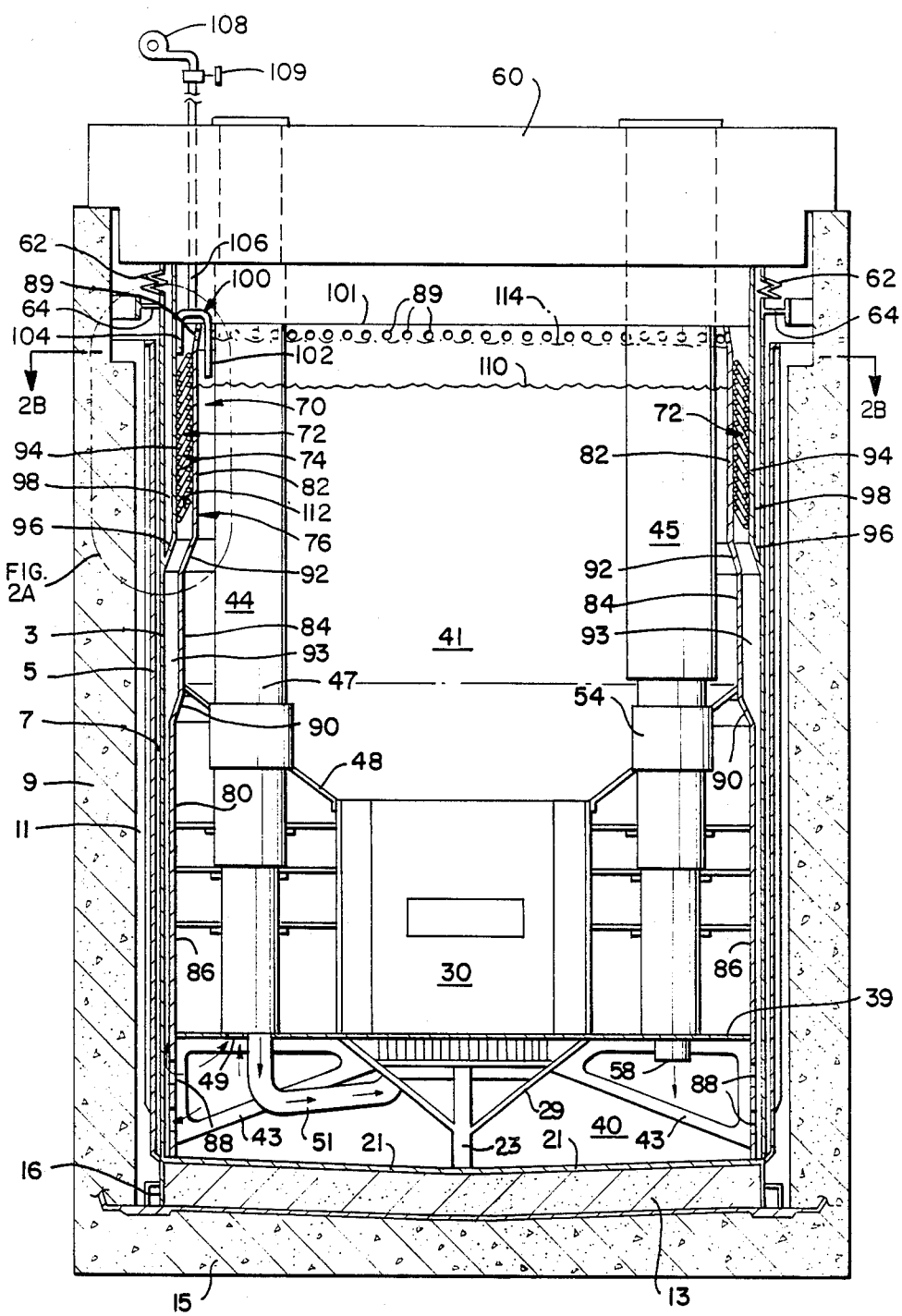
FIG. 1 is a cross-sectional side view of a pool-type liquid metal reactor that includes a first embodiment of the heat removal system of the invention.

With reference now to FIG. 1, wherein like numerals designate like components throughout all of the several figures, the shut-down heat removal system of the invention is shown installed within a pool-type liquid metal reactor facility 1, although it may be used within a loop-type liquid metal reactor as well.

Such pool-type reactor facilities 1 include a generally cylindrical reactor vessel 3 that is surrounded by a guard vessel 5. FIG. 1 illustrates the reactor vessel 3 as being of the bottom-supported type; however, the invention is compatible with suspended-type reactor vessel designs as well. Between the reactor vessel 3 and the guard vessel 5 is an annular gas space 7 that helps to insulate the walls of the reactor vessel 3 from the rest of the facility 1. This annular gas space 7 is typically filled with an inert gas, such as nitrogen, that will not react with the liquid sodium in the unlikely event that the vessel 3 should develop a leak. Both the reactor vessel 3 and the guard vessel 5 are in turn further surrounded by a concrete, reactor cavity structure 9 that is again generally cylindrical in shape. The guard vessel 5 is concentrically disposed within the reactor cavity structure 9 so as to create a second insulating annular gas space 11 therebetween. Unlike the first annular gas space 7, this space 11 may be filled with air or nitrogen. In order to provide both support and thermal insulation for the bottom of the reactor vessel 3, an insulating bed 13 of sand-like magnesium oxide about twenty inches deep is placed over the base mat 15 of the reactor cavity structure 9. This insulating bed 13 is circumscribed by an annular support ring 16. The ring 16 includes a plurality of inwardly, radially extending members (not shown) that allow for radial thermal expansion of the vessel 3, but which prevent lateral motions of the vessel 3 which may occur as a result of seismic disturbances. The reactor vessel 3 further includes a slightly tapered, circular bottom end wall 21, as shown. This bottom end wall 21 overlies the insulating bed 13 of magnesium oxide. The edge of the circular, bottom end wall 21 is connected to the upper edge of the annular support ring 16 for support. The insulating bed 13 of magnesium oxide also provides support for the bottom end wall 21 of the reactor vessel 3. Centrally disposed over the bottom end wall 21 is a column 23 that helps to support a nuclear core 30. On its upper end, the column 23 is surrounded by a conical wall 29 that defines an inlet plenum for the reactor core 30. The reactor core 30 is centrally disposed within the reactor vessel 3, as shown. Although not specifically shown in FIG. 1, the reactor core 30 includes an array of fuel rod assemblies that impart a substantial amount of heat to the liquid sodium that circulates through the core 30. Disposed between the column 23 and the nuclear core 30 is a circular support plate 39. This plate 39 co-acts with column 23 to support the core 30 and also divides the liquid sodium within the reactor vessel 3 into a cold pool plenum 40 located at the bottom of the vessel 3, and a hot pool plenum 41 located at the middle and upper portions of the vessel 3. The support plate 39 also forms a pressure boundary between the liquid sodium in the cold pool plenum 40, and the relatively hotter liquid sodium in the hot pool plenum 41. Underneath the circular support plate 39 are a plurality of radially oriented trusses 43. These trusses 43 assist the plate 39 in supporting both the primary pump 44 (located on the left side of the core 30) and the intermediate heat exchanger 45 (located on the right side of the core 30).

The primary pump 44 is generally formed from a vertically oriented standpipe 47 that is laterally supported by a lateral baffle 48. The inlet port 49 of the pump 44 is located at the bottom edge of the pump standpipe 47, in order that it may communicate through a port in the support plate 39 with the liquid sodium in the cold pool plenum 40. The outlet of the pump 44 is connected to an outlet conduit 51 that communicates with an opening (not shown) in the inlet plenum defined by conical wall 29. In operation, the primary pump 44 sucks the relatively cooler liquid sodium from the cold pool plenum 40 and forcefully circulates it through the outlet conduit 51 to the plenum within the conical wall 29 which in turn uniformly distributes the sodium to the fuel rod assemblies located within the core 30 in order to heat it up. Under normal operating circumstances, the primary pump 44 creates approximately a 100 psi pressure differential between the liquid sodium in the cold pool plenum 40, and the liquid sodium disposed in the inlet plenum defined by the conical wall 29. This pressure is dissipated as the sodium passes through the core 30, and flows into the hot pool plenum 41, but remains large enough after reaching the hot pool plenum to create a substantial pressure differential between the hot and cold pools.

Like the primary pump 44, the intermediate heat exchanger 45 includes a vertically oriented standpipe 54 that is prevented from lateral movement by the lateral baffle 48. Although not specifically illustrated in FIG. 1, the intermediate heat exchanger 45 includes a secondary system conduit for circulating sodium through the hot pool to a secondary heat exchange system that ultimately generates nonradioactive steam that is used to turn the turbines of electric generators. The relatively cooler liquid sodium that circulates past the heat extraction tubes of the secondary heat exchange system is ultimately discharged through the outlet 58 at the bottom of the intermediate heat exchanger 45 and into the cold pool plenum 40, as shown. Such discharge, of course, is created as a result of the suction pressure differential that the primary pump 44 creates between the cold pool plenum 40 and the hot pool plenum 41.

Located on top of the reactor vessel 3 is a closure deck 60 formed from steel plates, steel ribs, and iron oxide shielding materials. The purpose of the closure deck 60 is to provide a thermal barrier between the reactor vessel 3 and the ambient atmosphere, as well as a radiological barrier for blocking the radiation emitted by the nuclear core 30. Between the lower edge of the closure deck 60 and the upper edge of the reactor vessel 3 is a metallic bellows 62. This metallic bellows 62 is a relatively flexible structure that will accommodate dimensional changes between the closure deck 60 and the walls of the reactor vessel 3 that are generated as a result of thermal differential expansion. Also included around the upper edges of the reactor vessel 3 are a series of top guide assemblies 64. These top guide assemblies 64 make sure that the vessel closure deck 60 moves in phase with the top edge of the reactor vessel 3 in case of a seismic disturbance. Other features of the bottom supported reactor facility illustrated in FIG. 1 are specifically described in U.S. patent application Ser. No. 795,592, filed Nov. 6, 1985, by J. E. Sharbaugh, and assigned to the Westinghouse Electric Corporation, the entire specification of which is specifically incorporated herein by reference. Although not shown in FIG. 1, the primary pump drive motor includes an auxiliary (or "pony") motor capable of creating a circulation flow that amounts to at least one-tenth of the normal circulation flow between the cold pool plenum 40 and the hot pool plenum 41.

Figure 2A:
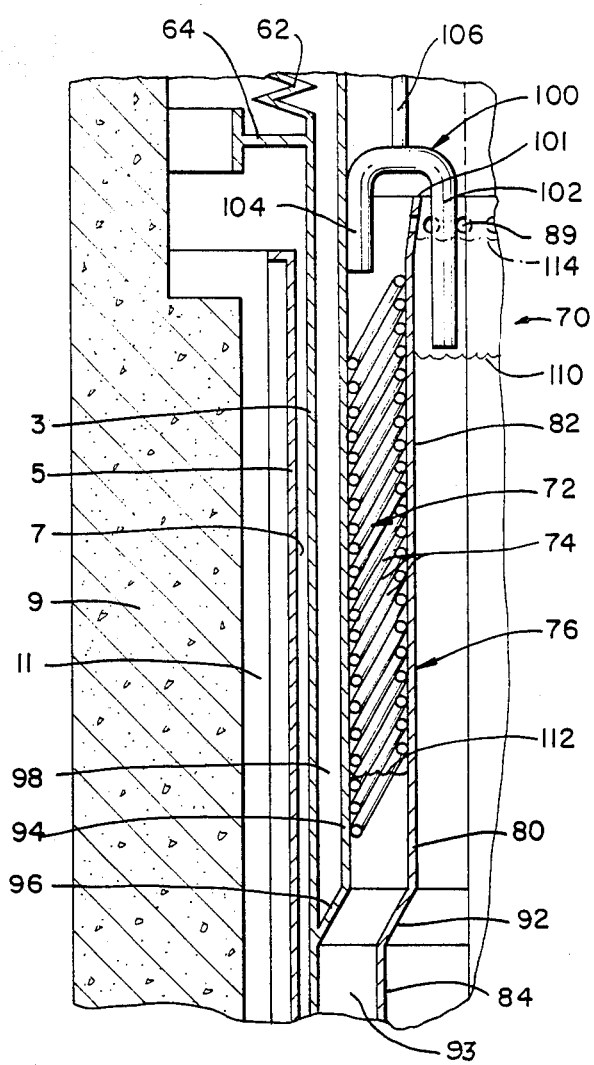
FIG. 2A is an enlargement of the area circled in FIG. 1.
Figure 2B:
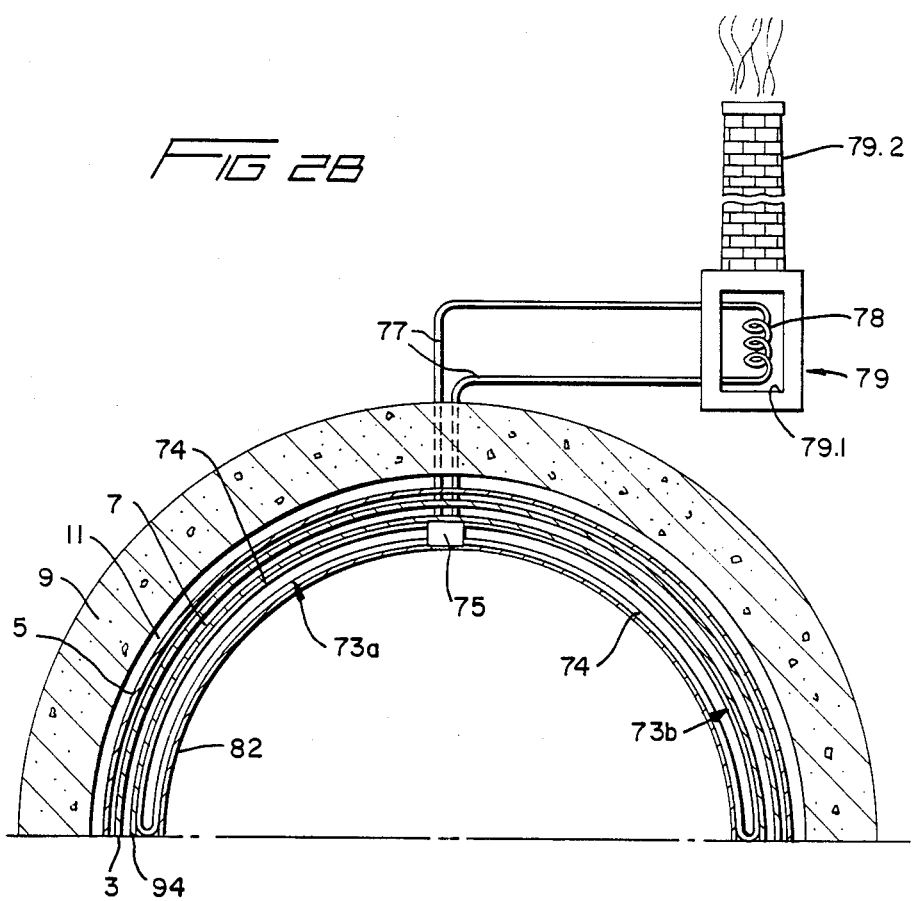
FIG. 2B is a partial plan view of the pool-type liquid metal reactor along the line 2B-2B in FIG. 1, showing the banks of hair-pin shaped pipes that form the inner coils of the auxiliary heat exchanger.

With reference now both to FIGS. 1, 2A and 2B, the first preferred embodiment of the shut-down heat removal system 70 includes a heat exchanger 72 whose inner end generally circumscribes the upper portion of the reactor vessel 3, as well as a redan 76 or wall that likewise circumscribes the upper portion of the reactor 3. As is best seen in FIG. 2B, the inner end of the heat exchanger 72 is formed from four banks 73a, 73b, 73c and 73d (of which only banks 73a and 73b are shown) of hairpin-shaped pipes 74. Each of the hairpin-shaped pipes 74 is bent in the shape of a quadrant so that it may conform to the circular shape between the upper part of the redan 76, and the upper wall of the reactor vessel 3. One end of each of the hairpin-shaped pipes in banks 73a, 73b (as well as 73c, 73d, not shown) converges into a header 75 which is essentially a manifold. Both of the headers 75 (only one of which is shown for simplicity) are connected to inlet and outlet pipes 77 which terminate in coils 78 that are in turn situated in natural-draft flues 79 (illustrated in schematic). These flues 79 are constantly kept open so that the coils 78 may be continuously cooled by a draft of ambient air. Because the invention 70 obviates the need for louvers across the draft entrances 79.1 of the flues 79, there is considerably less flow resistance for the drafts entering the entrances 79.1. This reduction in flow resistance allows the stacks 79.2 used in such flues to be advantageously shortened, thereby reducing the overall cost of constructing such flues 79.

In the preferred embodiment, each of the banks 73a–73d shown in FIG. 2B includes between thirteen and fifteen hairpin-shaped pipes 74 stacked in the configuration indicated in FIG. 1. Additionally, each of the pipes 74 is preferably formed from 2½ inch, schedule 40 stainless steel piping. The use of headers 75 in lieu of individual connections between the hairpin-shaped pipes 74 and the inlet and outlet pipes 77 advantageously minimizes the amounts of pipe penetrations required in the closure deck 60. While it would be possible to replace the banks 73a–73d with a single coil structure with 360° coils that wound completely around the reactor vessel 3, the pressure drop associated with such a design would lessen the efficiency of the heat exchanger 72. Accordingly, the use of four separate banks 73a–73d of hairpin-shaped pipes 74 is preferred. Finally, while liquid sodium would be operative as a coolant in each of the hairpin-shaped pipes 74, a mixture of liquid sodium and liquid potassium (or "NaK") is preferred since such a mixture will remain in a liquid phase at a lower temperature than pure liquid sodium would. This is an important consideration, because the response time of the system 70 could be impaired if the coolant within the coils 78 ever dropped to a temperature which allowed it to solidify, either partially or completely.

Turning now to FIGS. 1 and 2A and a more specific description of the redan 76, this structure is formed from a first cylindrical wall 80 having an upper section 82, a mid-section 84 that is offset from the upper section 82, and a lower section 86 that is offset from the mid-section 84. The bottom edge of the lower section 86 includes flow ports 88 for a purpose that will be described presently, while the top edge of the upper section 82 includes a plurality of spillover ports 89. The provision of such ports 89 ensures that any spillover of liquid sodium from the hot pool plenum 41 will occur uniformly around the circumference of the cylindrical wall 80. The mid-section 84 and the lower section 86 of the wall 80 are joined by a lower conical shell 90, and the mid-section 84 and upper section 82 are further joined by an upper conical shell 92. These shells 90 and 92 have the effect of spacing the midsection 84 and upper section 82 farther away from the inner wall of the reactor vessel 3 in a stepped fashion. As a result of this spacing, an annular space 93 is formed between the first cylindrical wall 80 and the reactor vessel 3 that radially increases in size from the lower section 86 to the upper section 82 of the first cylindrical wall 80. The flow ports 88 located at the bottom of the lower section 86 of the wall 80 bring this annular space 93 into communication with the liquid sodium in the cold pool plenum 40.

The heat removal system 70 further includes a second cylindrical wall 94 that extends away from the inside surface of the reactor vessel 3 by means of a conical shell 96 that parallels the previously described conical shell 92. The purpose of the second cylindrical wall 94 is to create an insulating gas space 98 between the upper portion of the reactor vessel 3, and the hot liquid sodium in the hot pool plenum 41. Finally, the system 70 of the first preferred embodiment includes a syphon mechanism 100, best seen in FIG. 2A. This syphon mechanism 100 straddles the edge 101 of the upper section 82 of the wall 80 with one leg 102 projecting into the liquid sodium in the hot pool plenum 41, and another leg 104 projecting down over the heat exchanger 72 located between the walls 80 and 94. A priming conduit 106 fluidly connects the syphon mechanism 100 to a suction pump 108. This conduit 106 has a valve mechanism 109 that is preferably remotely operable for a purpose that will be described hereinafter.

In operation, the flow ports 88 in the lower section 86 of the wall 80 allow the liquid sodium level 112 in the annular space 93 to fall to a level that barely immerses the lowest pipes 74. If there were no pressure differential between the liquid sodium in the hot pool plenum 41 and the cold pool plenum 40, then the sodium level 112 and the level of the sodium in the hot pool plenum 41 would be equal to the sodium level 110. However, due to the suction pressure differential generated by the primary pump 44, the level 112 of the sodium in the annular space 93 defined by the wall 80 of the redan 76 drops to the level that barely immerses the first or second pipes 74 of the heat exchanger 72. While it would be possible to design the redan 76 so that the level 112 of the liquid sodium within the annular space 93 made no contact whatever with the lower pipes 74 of the heat exchanger 72, some minimal contact is preferred in order to keep the liquid metal within the pipes 74 liquid at all times so that there is always at least some circulation of coolant moving through the heat exchanger 72. Such minimal contact is not enough to significantly affect the efficiency of the reactor facility 1 as a whole, but yet will insure that the system 70 will respond rapidly to a shut-down condition, since the coolant will never have a chance to solidify in the pipes 74. As is evident from the foregoing description, if the primary pump 44 should ever fail to create the pressure differential between the sodium in the hot and cold plenums 41 and 40, the level 112 of the liquid sodium in the annular space 93 will rise to a point where it substantially (if not completely) immerses all of the pipes 74 forming the heat exchanger 72. Such immersion will immediately heat the coils 78 that the hairpin-shaped pipes 74 are all ultimately connected to, which in turn will increase the draw of air through the flue 79. The end result is that the heat exchanger 72 would immediately begin to conduct a substantial amount of heat out of the reactor system 1 and through the stack 79.2 of the flue 79. Moreover, as the temperature in the sodium in the hot pool plenum 41 began to rise as a result of the decay heat from the core 30, the level 110 of the liquid sodium in the hot pool plenum 41 would rise to a level 114 (shown in phantom) level with the flow holes 89 in the upper section 82 of the wall 80, thereby causing an overflow of liquid sodium over the redan 76. Such an overflow would in turn cause the hottest liquid sodium in the hot pool plenum 41 (which has risen over the dashed line drawn across the plenum 41 to the top of the pool) to flow down through the annular space 93 into the relatively cooler sodium in the cold pool plenum 40, thereby circulating the sodium within the vessel 3 by natural convection. If the condition which caused the failure of the primary pump 44 does not render the syphon pump 108 inoperative, this pump 108 may be actuated (after valve 109 is opened) in order to induce such a natural circulation before the sodium in the hot pool plenum 41 thermally expands to a level 114 which causes it to overflow onto the heat exchanger 72. If circumstances permit, this is the preferred manner of operation of the first embodiment of the invention, since it results in a lower peak temperature for the sodium in the hot pool plenum 41.

Figure 3B:
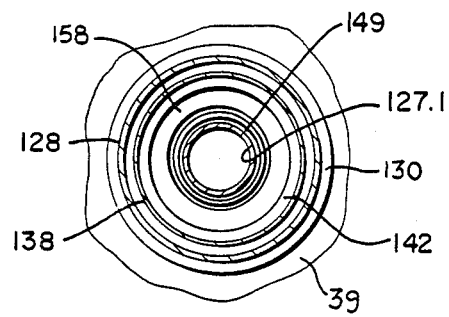
FIG. 3B is a partial plan view of the second embodiment of the invention along the line 3B-3B in FIG. 3A.
Figure 3A:
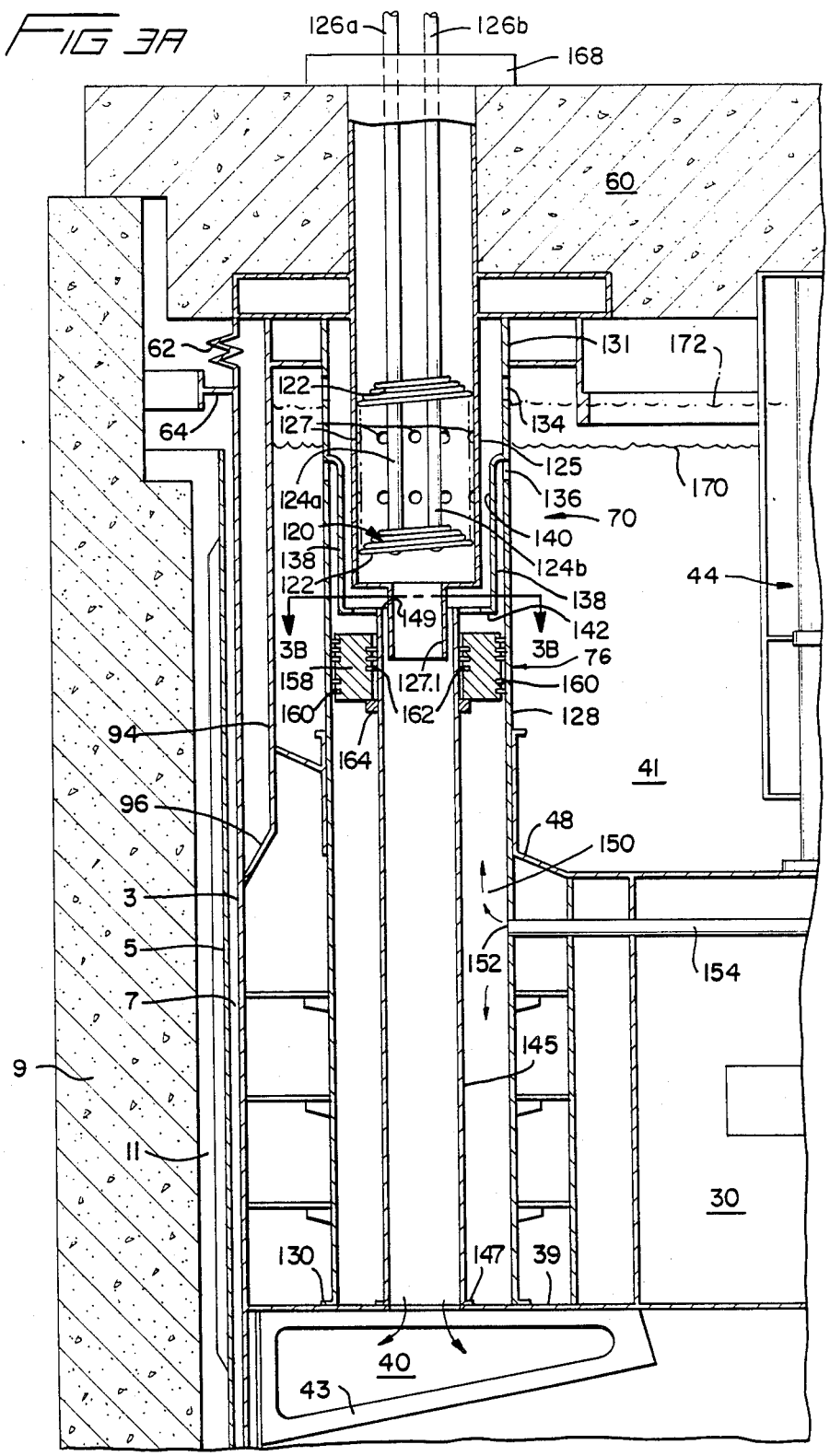
FIGS. 3A is a cross-sectional side view of a second embodiment of the invention.

FIGS. 3A and 3B illustrate an alternative embodiment of the shut-down heat removal system 70 of the invention. In this embodiment, a heat exchanger 120 is formed from a plurality of nesting coils 122, each of which is formed in the shape of a conical helix. While the heat exchanger 120 preferably includes a multiplicity of such coils, only two are shown in FIG. 3 in order to simplify the drawing. A liquid metal coolant such as NaK is conducted to and from these nesting coils 122 by means of inlet and outlet manifolds 124a, 124b. The entire set of nesting coils 122 is contained in a cylindrical housing 125 as shown. Inlet and outlet conduits 126a, 126b connected to the manifolds 124a, 124b in turn circulate the liquid metal coolant from the nesting coils 122 to coils (not shown) situated in natural air draft flues constructed like the previously described flue 79. It should be noted that the cylindrical housing 125 includes a plurality of inlet ports 127 in order that liquid sodium from the hot pool plenum 41 may freely flow over these coils 122 in the event of a shut-down condition.

In lieu of the wall-type redan 76 utilized in the first embodiment of the invention, the second embodiment houses the heat exchanger 120 in the upper portion of a vertically oriented, outer standpipe 128. This standpipe 128 is secured against lateral motion by a lateral baffle 48. The bottom edge 130 of the outer standpipe 128 is mechanically mounted and sealingly engaged onto the support plate 39 that forms the pressure boundary between the hot and cold sodium plena 41 and 40. The top of the outer standpipe 128 is spaced a short distance away from the bottom surface of the closure deck 60, and includes a set of upper inlet ports 134, and a set of lower inlet ports 136. A skirt-like annular wall 138 circumscribes the inner surface of the upper portion of the outer standpipe 128. This annular wall 138 has an upper edge 140 that is sealingly engaged to the inner wall of the outer standpipe 128 just above the lower inlet ports 136 so that any liquid sodium that enters these ports 136 must flow through the space between the annular wall 138 and the inner surface of the outer standpipe 128 before reaching the heat exchanger 120. The bottom edge of the annular wall 138 terminates in a ring-like lower edge 142 as shown.

The second embodiment of the shut-down heat removal system further includes an inner standpipe 145 that is contained within the outer standpipe 128. The bottom edge 147 of the inner standpipe 145 is also mounted onto and sealingly engaged with the support plate 39. Further, as is not the case with the outer standpipe 128, the interior of the inner standpipe 145 communicates with the cold sodium plenum 40 through an aperture (not shown). The top edge 149 of the inner standpipe 145 extends to a point adjacent to the bottom of the cylindrical housing 125 of the heat exchanger 120. In the preferred embodiment, the inner standpipe 145 is concentrically disposed with respect to the outer standpipe 128, so that an elongated, annular space 150 is defined between the outer surface of the inner standpipe 145, and the inner surface of the outer standpipe 128. This elongated, annular space 150 communicates with the discharge outlet of the primary pump 44 through a laterally disposed port 152 that is connected to a discharge conduit 154 that leads to the outlet (not shown) of the primary pump 44. Hence, the elongated, annular space 150 is normally filled with liquid sodium that is pressurized relative to the liquid sodium in the cold pool plenum 40.

A ring-shaped piston member 158 is slidably disposed within the elongated, annular space 150 between the inner and outer standpipes 145, 128. This piston member 158 includes a plurality of outer seals 160 that engage the inner wall of the outer standpipe 128, as well as a plurality of inner seals 162 that slidingly engage the outer surface of the inner standpipe 145. Finally, the inner standpipe 145 is circumscribed by an annular ledge 164. As will be seen hereinafter, the ledge 164 defines the lowest position that the piston member 158 can attain, while the ring-like lower edge 142 of the annular wall 138 defines the highest position that the piston member 158 can attain.

In operation, pressurized sodium from the primary pump 44 flows through the conduit 154, port 152, and pushes the ring-shaped piston member 158 upwardly so that its top surface sealingly engages the ring-shaped ledge 164 that defines the lower edge of the annular wall 138. When the piston member 158 is so positioned, liquid sodium entering the lower inlet ports 136 of the outer standpipe 128 can flow no further than the annular space defined between the annular wall 138, and the inside surface of the outer standpipe 128. While liquid sodium from the cold plenum 40 can exist in the inner standpipe 145, the level it attains will be no higher than the lowermost coils 122 of the heat exchanger 120. It will not attain the same level as the liquid sodium in the hot pool plenum 41 due to the pump suction pressure differential developed between the cold and hot plenums 40 and 41 when the pumps 44 are operating. However, if the primary pump 44 should ever cease to create the suction pressure differential between the cold and hot plenums, the weight of the piston member 158 will cause it to fall down toward the annular ledge 164 that circumscribes the upper portion of the inner standpipe 145, so that the piston member assumes the position illustrated in FIG. 3A. When this occurs, liquid sodium is free to flow through the lower inlet ports 136, around the ledge 142 that forms the lower edge of the annular wall 138, and up into the inlet port 127 of the cylindrical housing 125 of the heat exchanger 120. From there, the liquid sodium will spill through the plurality of helical coils 122 that form the heat exchanger 120, and ultimately spill downwardly to the liquid sodium in the cold plenum 40 (which has risen to approximately the same level as the liquid sodium in the hot plenum 41 due to the lack of any pressure differential therebetween). Hence, not only are the coils 122 that form the heat exchanger completely immersed in liquid sodium, but the circulation path between the hot pool plenum 41 and the cold pool plenum 40 is also immediately established. As is evident from the foregoing, the second embodiment of the invention has the advantage of immediately establishing such a circulation path without depending upon decay heat from the nuclear core 30 to thermally expand the sodium in the hot pool plenum 41 to a spillover point over the redan.

We claim:

1. In a liquid metal nuclear reactor of the type having a vessel that holds lower and higher temperature pools of liquid metal, and a pump means for creating a pressure differential between said pool so that liquid metal circulates from said lower to said higher temperature pools through a reactor core, an improved shut-down heat removal system comprising a heat exchange means and a redan means for prventing said heat exchange means from coming into substantial contact with said liquid metal when said pump means creates said pressure differential, but which directs a flow of liquid metal into contact with said heat exchange means as a result of said pump means ceasing to create said pressure differential.

2. In a liquid metal nuclear reactor of the type having a vessel that holds lower and higher temperature pools of liquid metal, and a pump means for creating a pressure differential between said pools so that liquid metal circulates from said lower to said higher temperature pools through a reactor core, an improved shut-down heat removal system comprising a redan means disposed between said pools, wherein said pools gravitate to different levels on different sides of the redan as a result of said pressure differential, and a heat exchange means disposed in said vessel above the level of one of said pools, but which becomes immersed in said pool as a result of a change in the level of said pool when said pump means ceases to create said pressure differential.

3. The system of claim 2, wherein said redan means also defines an alternative circulation path between said lower and higher temperature pools whenever said pump ceases to create said pressure differential.

4. The system of claim 3, wherein the lower and higher temperature pools are located in the lower and upper portions of the vessel, respectively, and said redan means circumscribes the inner surface of the vessel to define a space therebetween.

5. The system of claim 4, wherein the lower portion of the space defined between the redan means and the vessel communicates with the lower temperature pool, and the upper portion of this space contains the heat exchange means.

6. The system of claim 5, wherein the level of the liquid metal in said space is substantially below the heat exchange means when said pump means creates said pressure differential, but rises to substantially immerse said heat exchange means when the pump means ceases to create this pressure differential.

7. The system of claim 6, wherein the level of the liquid metal in the higher temperature pool rises over the upper edge of the redan means and spills into the liquid metal in the space between the redan means and the inner surface of the vessel as a result of thermal expansion whenever said pump means ceases to create said circulation between said higher and lower temperature pools.

8. The system of claim 6, further including a syphon means disposed over the upper edge of the redan means for providing a circulation between said higher temperature pool and the liquid metal in the space between the redan means and the vessel.

9. The system of claim 3, wherein the lower and higher temperature pools are located in the lower and upper portions of the vessel, respectively, and substantially separated by a support plate, and wherein the redan means includes a first standpipe having a bottom end sealingly engaged to said support plate and a top end that surrounds the heat exchange means and includes an opening for the admission of liquid metal therein.

10. The system of claim 9, wherein said redan means includes a second standpipe within the first standpipe that has a bottom end in communication with the lower temperature pool, and an upper end that terminates beneath the heat exchange means, and wherein the space defined between the first and second standpipes communicates with the output of the pump means.

11. The system of claim 10, further including a piston means slidably mounted around the second standpipe for preventing liquid metal from the higher temperature pool from flowing through the opening in the first standpipe and on through the second standpipe when the pump means creates said pressure differential between said upper and lower temperature pools, and for admitting liquid metal through said opening, onto said heat exchange means and on through the second standpipe and into the lower temperature pool when the pump means ceases to create said pressure differential.

12. The system of claim 11, wherein said piston means is lifted to a flow-preventing position by the pressure differential created by the pump means, but falls to a flow-admitting position when said pump means ceases to create said pressure differential.

13. In a liquid metal nuclear reactor of the type having a vessel that holds lower and higher temperature pools of liquid metal, and a pump means having an input and an output of liquid metal for creating a pressure differential between the pools that circulates liquid metal from said lower to said higher temperature pool through a reactor core, an improved shutdown heat removal system comprising a redan means disposed between said pools, wherein said pools gravitate to different levels on different sides of the redan as a result of said pressure differential, and a heat exchange means disposed in said vessel above the level of one of said pool, but which becomes immersed in said pool as a result of a change in the level of said pool caused by the cessation of the pressure differential created by the pump.

14. The system of claim 13, wherein the higher temperature pool of liquid metal is located above the lower temperature pool, and wherein the higher and lower temperature pools are substantially separated by a support plate.

15. The system of claim 14, wherein the redan circumscribes the inner surface of the vessel that contains the higher and lower temperature pools of metal, thereby defining an annular space, and wherein said redan further includes at least one opening means for putting said annular space into fluid communication with the lower temperature pool of liquid metal so that liquid metal from the lower temperature pool fills the annular space to a first level whenever said pump means creates said pressure differential, but rises within said annular space to a second level whenever said pump means ceases to create said pressure differential.

16. The system of claim 15, wherein said heat exchange means is positioned within said annular space between said first and second levels of said liquid metal in said space so that said heat exchange means becomes substantially submerged by the liquid metal in the annular space whenever said pump means ceases to create said pressure differential.

17. The system of claim 15, wherein the upper edge of the redan is above the level of the liquid metal in the higher temperature pool during normal operating conditions, but wherein the level of the liquid metal rises over said upper edge and spills over into said annular space due to thermal expansion whenever the temperature of the liquid metal rises to a level that indicates that the pump means has ceased to cause a circulation between the higher and lower temperature pools.

18. The system of claim 17, further including a syphon means disposed over the upper edge of the redan for providing a circulation between said higher temperature pool and the liquid metal in the annular space between the redan and the vessel, and a syphon pump means in fluid communication with said syphon for selectively initiating said circulation.

19. The system of claim 13, wherein the lower and higher temperature pools are located in the lower and upper portions of the vessel, respectively, and substantially separated by a support plate, and wherein the redan means includes
(a) a first standpipe having a bottom end that is mounted on and sealingly engaged against the support plate, and a top end that contains said heat exchange means and includes an opening for the admission of liquid metal from the upper temperature pool, and
(b) a second standpipe located within the first standpipe that has a bottom end in fluid communication with the lower temperature pool, and an upper end that terminates beneath the heat exchange means, and wherein the space defined between the first and second standpipes communicates with the liquid metal output of the pump means.

20. The system of claim 19, further including a piston means slidably mounted around the second standpipe for preventing liquid metal from the higher temperature pool from flowing through the opening in the first standpipe and on through the second standpipe when the pump means creates said pressure differential between said upper and lower temperature pools, and for admitting liquid metal through said opening onto said heat exchange means, and on through the second standpipe and into the lower temperature pool when the pump means ceases to create said pressure differential.

21. The system of claim 20, wherein said piston means is lifted to a flow-preventing position by the pressure differential created by the pump means, but falls to a flow-admitting position when said pump means ceases to create said pressure differential.

22. The system of claim 21, wherein the liquid metal opening at the top end of said first standpipe is located below the normal operating level of the liquid metal in the higher temperature pool, and wherein said top end includes a skirt that circumscribes the inner surface of the first standpipe in the region that includes the opening for liquid metal, said skirt having an upper edge that is sealingly connected around the inner surface of the standpipe, and a lower edge that sealingly engages the top end of the piston means when said pressure differential created by the pump means lifts said piston means to said flow-preventing position.

23. The system of claim 22, wherein said heat exchange means is located substantially within said skirt, so that when said piston means falls to said flow-admitting position, liquid metal flows between the lower edge of the skirt and the top of the piston means, over the heat exchange means and through the second standpipe and finally to the lower temperature pool.

24. The system of claim 22, further including a ledge means disposed between the first and second standpipes for limiting the extent that said piston means may fall within said standpipes.

25. The system of claim 22, wherein said piston means includes sealing rings for sealingly engaging said piston means to the inner and outer surfaces of said first and second standpipes, respectively.

* * * * *